United States Patent [19]

Yamashita et al.

[11] Patent Number: 4,945,241
[45] Date of Patent: Jul. 31, 1990

[54] POSITION-SENSITIVE RADIATION DETECTOR

[75] Inventors: Takaji Yamashita; Hiroshi Uchida, both of Shizuoka, Japan

[73] Assignees: Hamamatsu Photonics Kabushiki Kaisha, Shizuoka; Research Development Corporation of Japan, Tokyo, both of Japan

[21] Appl. No.: 320,255

[22] Filed: Mar. 7, 1989

[30] Foreign Application Priority Data

Mar. 10, 1988 [JP] Japan .................................. 63-57233

[51] Int. Cl.⁵ .............................................. G01T 1/202
[52] U.S. Cl. .................................. 250/367; 250/487.1
[58] Field of Search .................... 250/367, 368, 363.09, 250/487.1

[56] References Cited

U.S. PATENT DOCUMENTS

| 4,675,526 | 6/1987 | Rogers et al. | 250/363.09 |
| 4,743,764 | 5/1988 | Casey et al. | 250/363.02 |
| 4,749,863 | 6/1988 | Casey et al. | 250/363.02 |
| 4,823,016 | 4/1989 | Yamashita et al. | 250/363.03 |
| 4,831,263 | 5/1989 | Yamashita | 250/368 |

OTHER PUBLICATIONS

Japanese Patent Application (Unexamined) Publication No. 61-237081; Oct. 22, 1986.
Japanese Patent Application (Unexamined) Publication No. 61-271486; Dec. 1, 1986.
Rogers et al., "Design of an Efficient Position Sensitive Gamma Ray Detector for Nuclear Medicine", Phys. Med. Biol., vol. 31, No. 10, pp. 1061-1090, 1986.
Wong, "Designing a Stratified Detection System for PET Cameras", IEEE Transactions on Nuclear Science, vol. 33, No. 1, pp. 591-596, Feb. 1986.
Rogers, "Testing an Improved Scintillation Camera for PET and SPECT", IEEE Transactions on Nuclear Science, vol. 33, No. 1, pp. 519-522, Feb. 1986.

Primary Examiner—Janice A. Howell
Assistant Examiner—Richard Hanig
Attorney, Agent, or Firm—Finnegan, Henderson, Farabow, Garrett and Dunner

[57] ABSTRACT

A position-sensitive radiation detector has a multi-layer scintillator assembly coupled to a position-sensitive photo-detector. Individual scintillator blocks of rectangular solid form in each scintillator layer are optically isolated by a reflecting agent such as $BaSO_4$, and the adjacent layers are optically coupled by a coupling agent such as silicon grease. In the case of the scintillator assembly of n layers, the scintillator blocks in one layer are staggered with those in the adjacent layer by one nth of the width of each block. In addition to information on a horizontal position, information on the depth of radiation absorption can be obtained by calculating the centroid or variance of a spatial distribution of light outputted from the scintillator assembly.

9 Claims, 4 Drawing Sheets

POSITION-SENSITIVE RADIATION DETECTOR

BACKGROUND OF THE INVENTION

1. Field of the Invention

This invention relates to a high-resolution position-sensitive radiation detector, which can also detect the position in depth of radiation absorption in a scintillator.

2. Prior Art

A conventional position-sensitive radiation detector has been disclosed in which independent scintillators in a columnar form are bound together in a mosaic and connected to a position-sensitive photo-detector (Japanese Patent Application Laid-open No. 237081/1986, Japanese Patent Application Laid-open No. 271486/1986). Another device is known in which a monolithic plate scintillator is connected to a position-sensitive photo-detector such as a photomultiplier tube (PMT) array, or the like for use as a position-sensitive radiation detector which can also detect the position in depth of radiation absorption in a scintillator (J. G. Rogers et al., Phys. Med. Biol. (1986), Vol. 31, No. 10, pp. 1061 to 1090).

FIG. 1 shows a conventional radiation detector in which a position-sensitive photo-detector is connected to a plate-like scintillator. In this drawing, reference numeral 1 represents the scintillator, reference numeral 2 represents the position-sensitive photo-detector, reference numerals 3 and 4 represent gamma rays, and reference numerals 5 and 6 represent scintillation light.

In this figure, the positions upon which the gamma rays 3 and 4 are made incident are detected by making use of the distribution positions of scintillation light outputted from the scintillator 1, for example, by calculating the center of gravity of the outputted light distribution. The radiation absorbed positions A and B in a vertical direction (the depth of scintillation points) are also detected by using the extent of distribution of the outputted light.

However, the type of position-sensitive radiation detector which uses a mosaic-shaped BGO (Bismuth Germanate) cannot obtain the information on the depth of the radiation absorption in a scintillator, that is, the information on the depth of the scintillation point. Although the radiation detector device shown in FIG. 1 can obtain the information on the depth of the radiation absorption in a scintillator, the light is distributed over a very large area, particularly when the scintillation light is emitted in an upper portion of the scintillator. This causes the deterioration of position resolution. The position resolution R is given by $$R \propto \frac{\sigma}{\sqrt{N}},$$

where the spread of light distribution is represented by $\sigma$, and the number of emitted photons is represented by N. Therefore, in the detector shown in FIG. 1 in which the spread of light output distribution $\sigma$ is large, the position resolution R deteriorates. The detector shown in FIG. 1 has the additional disadvantage that a distortion in light distribution that occurs at the edges of the scintillator will deteriorate the position resolution and linearity in the neighborhood of those edges.

The occurrence of a positional error called a parallax error $\Delta$ is illustrated in FIG. 2. When two radiation rays are diagonally made incident on the scintillator 1 with the same incident direction and position, are absorbed at the different positions A and B, and scintillation light is emitted from positions A and B, these two radiation rays are detected as if these two rays have different incident positions (the parallax error $\Delta$). (If the scintillator 1 is sufficiently thin, that is, a thickness T is small enough, these two radiation rays are substantially detected as the same ones with the same incident position O.) If the information D on the absorption depth is obtained, this type of error can be eliminated. This is important for application to a positron CT and so on.

SUMMARY OF THE INVENTION

An object of the present invention is, therefore, to provide a position-sensitive radiation detector that can obtain information on the depth of the scintillation point in a scintillator.

Another object of the present invention is to provide a radiation detector having an improved position resolution.

This object of the present invention can be attained by a position-sensitive radiation detector that has a multi-layer scintillator assembly coupled to a position-sensitive photo-detector. More specifically, individual scintillator blocks of rectangular solid form in each scintillator layer are optically isolated by a reflecting agent, and the adjacent layers are optically coupled by a coupling agent. In the case of the scintillator assembly consisting of n layers, the scintillator blocks in one layer are staggered with those in the adjacent layer by one nth of the width of each block.

In addition to information on a horizontal position of radiation absorption, information on the depth (vertical position) of radiation absorption can be obtained. According to the first embodiment, the information on the depth is determined by calculating the centroid of a spatial distribution of light outputted from the scintillator assembly. According to the second embodiment it is determined by calculating the variance of a spatial distribution of light outputted from the scintillator assembly.

Other and further objects, features and advantages of the invention will appear more fully from the following description taken in connection with the attached drawings.

DETAILED DESCRIPTION OF THE PREFERRED EMBODIMENTS

Embodiments of the present invention are described hereinafter with reference to the accompanying drawings.

Figure 1:
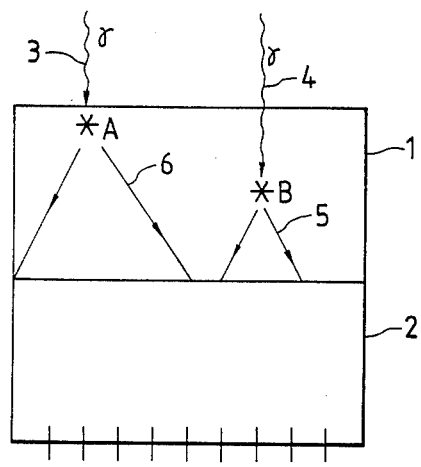
FIG. 1 illustrates a conventional position-sensitive radiation detector in which a plate-like scintillator is connected to a position-sensitive photo-detector.
Figure 2:
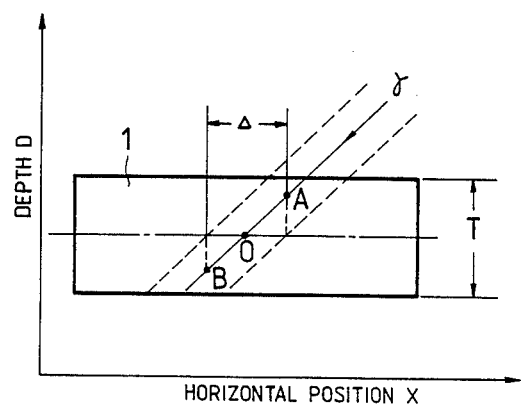
FIG. 2 illustrates the occurrence of a parallax error in a position-sensitive radiation detector.
Figure 3:
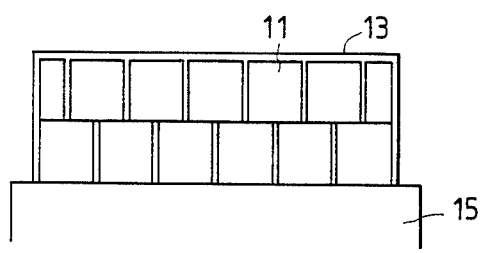
FIGS. 3 and 4 are cross-sectional views showing position-sensitive radiation detectors according to the present invention.
Figure 4:
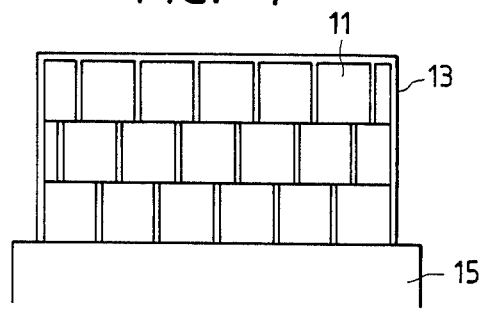

FIG. 3 and 4 are cross-sectional views showing two types of the radiation detector of the present invention, in which a plurality of scintillator blocks 11 are superposed in two layers (FIG. 3) or three layers (FIG. 4). Shown by 13 and 15 in each diagram are a reflecting agent and a position-sensitive photo-detector, respectively.

The individual scintillators 11 are made of BGO blocks in rectangular solid form. The individual blocks within each layer are optically isolated by a reflecting agent such as $BaSO_4$, whereas the individual layers of scintillators are optically coupled by a suitable agent such as silicone grease. All exterior surfaces of the scintillators except where they are coupled to the position-sensitive photo-detector 15 are also coated with a reflecting agent 13.

Scintillator layers are coupled together in such a way that the blocks in one layer are staggered with those in an adjacent layer by one half of the width of each block when two scintillator layers are superposed as shown in FIG. 3, and; by one third of the width of each block when three scintillator layers are superposed as shown in FIG. 4. Stated generally for the case where n layers of scintillators are superposed, the blocks in every two adjacent scintillator layers are staggered by one nth of the width of each block.

The operation of a position-sensitive radiation detector according to the first embodiment of the present invention is described hereinafter with reference to FIG. 5 which shows the case where the scintillator assembly is composed of three layers in superposition. In FIGS. 5(A) to 5(C), (a-1), (a-2) ..., (b-1), (b-2) ..., and (c-1), (c-2) ... denote the scintillator blocks in layers a, b and c, respectively, and the numerals below the bottom scintillator layer designate coordinate values in the X-direction.

Figure 5A:
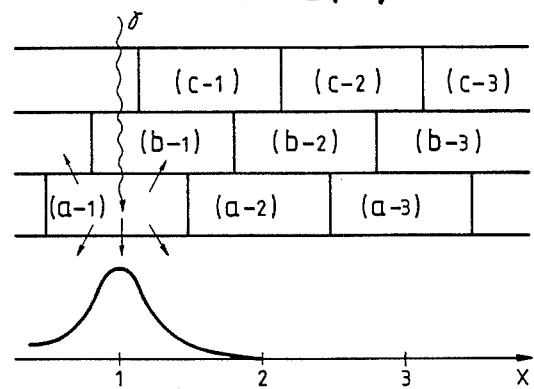
FIG. 5 is a diagram showing the operation of a position-sensitive radiation detector according to the first embodiment of the invention.

With reference to FIG. 5(A), scintillation light beams are produced when a gamma ray is absorbed at a certain position in the scintillator block (a-1). While the scintillation light beams will travel from the point source of emission in all directions, the light beams departing away from the position-sensitive photo-detector will undergo multiple reflections and only a very small portion of it will finally reach the position-sensitive photo-detector, producing a fairly diffusive spatial distribution of light. On the other hand, most of the light beams travelling directly towards the position-sensitive photo-detector will be picked up as an output by the position-sensitive photo-detector. Therefore, the centroid of spatial distribution, $X_{a-1}$, of light beams which are produced in the Scintillator block (a-1) and presented to the entrance surface of the photo-detector will be in substantial coincidence with the position of the center of the scintillator block (a-1) in which the event of light emission occurred.

Figure 5B:
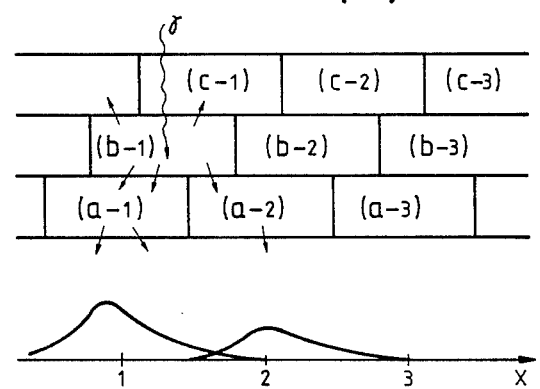

When a gamma ray is absorbed in a scintillator block (b-1) as shown in FIG. 5(B), scintillation light beams that travel away from the photo-detector would undergo multiple reflections as in the case described with reference to FIG. 5(A). Light beams travelling toward the photo-detector have their quantity distributed between scintillator blocks in the adjacent layer in accordance with the area over which they contact the block (b-1). In the case under consideration, two thirds of the light are presented to a block (a-1) and one third to a block (a-2), and the so-proportioned amounts of light will eventually emerge from the blocks (a-1) and (a-2) to be picked up by the photo-detector.

The position of centroid Xc of the spatial distribution of output light may be expressed by:

$$X_c = \frac{\Sigma N_i X_i}{\Sigma N_i}$$

where $N_i$ is the amount of light issuing from an individual scintillator block in the output layer and $X_i$ is the position of the center of that scintillator block. Using this equation, the position of centroid $X_{b-1}$ of light distribution for the case being discussed will be:

$$X_{b-1} = \frac{\left(\frac{2}{3} \times 1\right) + \left(\frac{1}{3} \times 2\right)}{\frac{2}{3} + \frac{1}{3}}$$
$$= 1\frac{1}{3}$$

This is in exact correspondence to the X coordinate of the center of scintillator block (b-1).

Figure 5C:
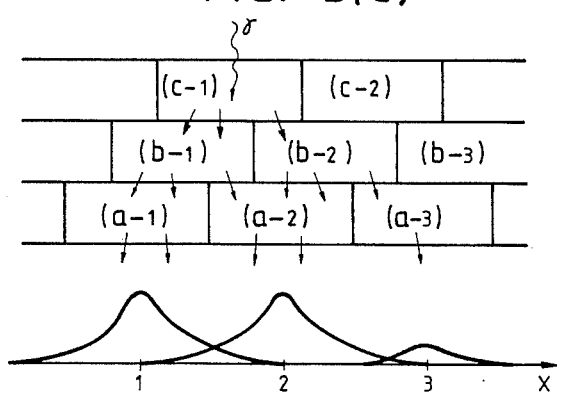

When light emission occurs in a scintillator block (c-1) as shown in FIG. 5(C), the scintillation light beams are first disbributed between blocks (b-1) and (b-2) in such a way that two thirds of the light are presented to (b-1) and one third to (b-2); then, the light from (b-1) is distributed between (a-1) and (a-2) in such a way that four ninths ($=\frac{2}{3} \times \frac{2}{3}$) of the light are presented to (a1) and two ninths ($=\frac{2}{3} \times \frac{1}{3}$) to (a-2), whereas the light from (b-2) is distributed between (a-2) and (a-3) in such a way that two ninths ($=\frac{1}{3} \times \frac{2}{3}$) of the light are presented to (a-2) and one ninth ($=\frac{1}{3} \times \frac{1}{3}$) to (a-3). Therefore, the final output is such that four ninths of the scintillation light are picked up from each of scintillation blocks (a-1) and (a-2) and one ninth from block (a-3). The position of centroid $X_{c-1}$ of the spatial distribution of output light is:

$$X_{c-1} = \frac{\left(\frac{4}{9} \times 1\right) + \left(\frac{4}{9} \times 2\right) + \left(\frac{1}{9} \times 3\right)}{\frac{4}{9} + \frac{4}{9} + \frac{1}{9}}$$
$$= 1\frac{2}{3}$$

This again coincides with the X coordinate of the center of scintillator block (c-1).

Even when light emission occurs in other scintillator blocks, the position of the center of the block in which the scintillation event occurred will coincide with the position of centroid of the spatial distribution of output light. Therefore, by calculating the position of centroid of a particular spatial distribution, the position at which a gamma ray was absorbed in a scintillator block can be computed. The coordinate systems shown in FIGS. 5(A) to 5(C) have the positions of the centers of scintillator blocks (a-1), (a2) ... denoted by integral values, and in such coordinate systems the position of centroid of spatial light distribution is determined as an integral value when a gamma ray was absorbed in any of the scintillator blocks in layer (a), or as an integral value plus one third thereof when a gamma ray was absorbed in any of the scintillator blocks in layer (b), or as an integral value plus two thirds thereof when a gamma ray was absorbed in any of the scintillator blocks in layer (c). Therefore, based on this difference in the value representing the position of centroid of spatial light distribution, one is also capable of obtaining depth-related information that identifies the layer of scintillator blocks in which light emission occurred as a result of absorption of a gamma ray.

Figure 6:
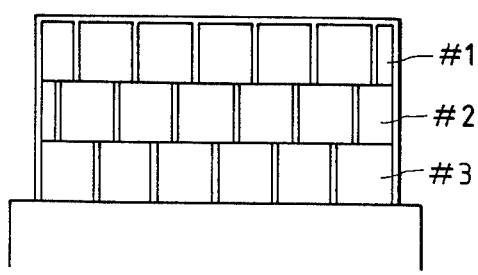
FIGS. 6 and 7 are diagrams showing the operation of a position-sensitive radiation detector according to the second embodiment of the invention.
Figure 7A:
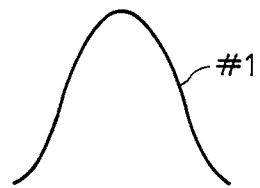
Figure 7B:
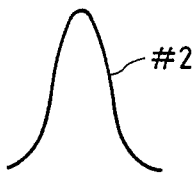
Figure 7C:
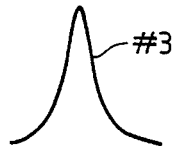

The operation of a position-sensitive radiation detector according to the second embodiment of the present invention is described hereinafter with reference to FIGS. 6 and 7. FIG. 6 shows the case where three layers of scintillator blocks are superposed. When scintillation light is produced in layer #1, the light incident upon the position-sensitive photo-detector will spread wide as shown in FIG. 7(A) for the reason already stated by referring to FIG. 5. When scintillation occurs in layer #2, the spread of incident light is somewhat reduced as shown in FIG. 7(B). The spread is the narrowest when scintillation occurs in layer #3 as shown in FIG. 7(C). The variance $\sigma$ of the spread under consideration is expressed by:

$$\sigma = \frac{\int f(X)\ (X - \overline{X})^2\ dX}{\int f(X)\ dX}$$

where f(X) is the spatial distribution function of light incident upon the photo-detector and $\overline{X}$ is the mean of X. The depth-related information can be obtained from the variance $\sigma$ based on the above equation.

The second embodiment does not rely upon the position of centroid of spatial light distribution for obtaining depth-related information, so it offers the advantage that it is immune to perturbations in scintillation events which would otherwise cause errors in the detection of the centroidal position of spatial light distribution.

Figure 8:
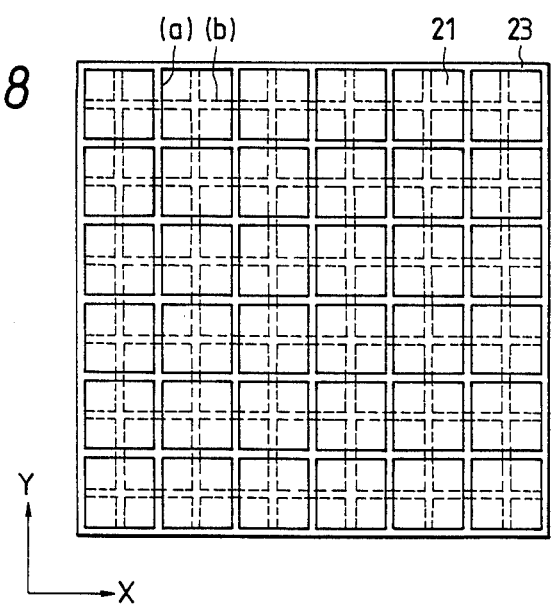
FIG. 8 is a plan view schematically illustrating a scintillator assembly consisting of two layers and having a horizontally two-dimentional arrangement of scintillator blocks.

Although the foregoing description is devoted to the position-sensitive radiation detectors with the scintillator assembly having the horizontally one-dimensional arrangement, the horizontally two-dimensional detection of the radiation incidence position can also be realized with the present invention. To this end, as shown in FIG. 8, employed is a scintillator assembly having scintillator blocks 21 regularly arranged in the X and Y directions and a lattice-shaped reflecting agent 23. FIG. 8 shows the case, for simplicity, of the scintillator assembly consisting of two layers (layer (a) indicated by solid lines and layer (b) indicated by dashed lines), where the scintillator blocks 21 in one layer are staggered with respect to those in the other layer by one half of the width of the block in each of the X and Y directions. Both cross-sectional views taken along the X and Y directions exhibit a structure similar to the structure shown in FIG. 3. The number of the scintillator layers is not restricted to two, and also it is not always required that the width of the blocks 21 in the X direction is equal to that in the Y direction. The operation of determining the radiation incidence position with the detection of the scintillation depth in this type of scintillator assembly is the same as the operation in the horizontally one-dimensional radiation detector except for the dimensional difference. That is, the depth-related information can be obtained by calculating the centroid or variance of the spatial distribution of the output light from the scintillator assembly.

As described on the foregoing pages, the position-sensitive radiation detector according to the first embodiment of the present invention has multiple layers of scintillator blocks coupled together in such a way that information about the position of incidence of radiation on the scintillator assembly and about the depth of light emission in the scintillator assembly can be obtained by calculating the centroidal position of the spatial distribution of the output light. Another way of obtaining information on the depth of a scintillation event, according to the second embodiment, is to calculate the variance of the spatial distribution of the output light. This latter method has the advantage of being insensitive to perturbations in scintillation events.

What is claimed is:

1. A position-sensitive radiation detector comprising:
   a scintillator assembly having a plurality of scintillator layers arranged in a vertical direction, each layer comprising a plurality of scintillator blocks of rectangular solid form regularly arranged in a first horizontal direction, the scintillator blocks of each scintillator layer being staggered in the first horizontal direction with respect to the scintillator blocks of an adjacent scintillator layer;
   reflection means disposed between adjacent ones of said scintillator blocks in a particular layer, for optically isolating said scintillator blocks;
   coupling means disposed between adjacent ones of said scintillator layers, for optically coupling said adjacent ones of said scintillator layers;
   position-sensitive photo-detecting means optically coupled to said scintillator assembly, for detecting scintillation light emanating from said scintillator assembly; and
   computing means for determining, by calculation of the depth of a scintillation point in said scintillator assembly, a scintillation position in said first horizontal direction and in said vertical direction on the basis of an output signal from said position-sensitive photo-detecting means.

2. A position-sensitive radiation detector according to claim 1, wherein there are n layers and said scintallator blocks in one of said scintillator layers are staggered with respect to the scintillator blocks in an adjacent one of said scintillator layers by one nth of the width of each of said scintillator blocks.

3. A position-sensitive radiation detector according to claim 1, wherein said depth of said scintillation point is calculated through calculating the centroid of a spatial distribution of said scintillation light emanating from said scintillator assembly.

4. A position-sensitive radiation detector according to claim 1, wherein said depth of said scintillation point is calculated through calculating the variance of a spatial distribution of said scintillation light emanating from said scintillator assembly.

5. A position-sensitive radiation detector according to claim 1, wherein said scintillator assembly has a coupling surface to said position-sensitive photo-detecting means and exterior surfaces and said exterior surfaces of said scintillator assembly are coated with a reflecting agent.

6. A position-sensitive radiation detector according to claim 1, wherein
   said plurality of scintillator blocks of rectangular solid form are regularly arranged further in a second horizontal direction which is perpendicular to said first horizontal direction;

said reflection means has a lattice form; and said computing means is for determining said scintillation position in said first and second horizontal directions and in said vertical direction.

7. A position sensitive-radiation detector according to claim 6, wherein there are n layers and said scintillator blocks in one of said scintillator layers are staggered with respect to the scintillator blocks in an adjacent one of said scintillator layers in each of said first and second horizontal directions by one nth of the width in a corresponding horizontal direction of each of said scintillator blocks.

8. A position-sensitive radiation detector according to claim 6, wherein said depth of said scintillation point is calculated through calculating the centroids with respect to said first and second horizontal directions of a spatial distribution of said scintillation light emanating from said scintillator assembly.

9. A position-sensitive radiation detector according to claim 6, wherein said depth of said scintillation point is calculated through calculating the variances with respect to said first and second horizontal directions of a spatial distribution of said scintillation light emanating from said scintillator assembly.

* * * * *